(12) United States Patent
Guo et al.

(10) Patent No.: US 10,650,025 B2
(45) Date of Patent: May 12, 2020

(54) METHOD AND APPARATUS FOR CHECKING AND UPDATING DATA ON A CLIENT TERMINAL

(71) Applicant: GUANGZHOU UCWEB COMPUTER TECHNOLOGY CO., LTD, Guangzhou (CN)

(72) Inventors: Qingqing Guo, Guangzhou (CN); Hui Gu, Guangzhou (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 863 days.

(21) Appl. No.: 15/340,720

(22) Filed: Nov. 1, 2016

(65) Prior Publication Data

US 2017/0124172 A1 May 4, 2017

(30) Foreign Application Priority Data

Nov. 3, 2015 (CN) .......................... 2015 1 0743027

(51) Int. Cl.
*G06F 16/27* (2019.01)
*G06F 16/23* (2019.01)

(52) U.S. Cl.
CPC ........ *G06F 16/275* (2019.01); *G06F 16/2379* (2019.01)

(58) Field of Classification Search
CPC .......................... G06F 16/275; G06F 16/2379
USPC ................................................ 707/624, 625
See application file for complete search history.

(56) References Cited

U.S. PATENT DOCUMENTS

| | | | |
|---|---|---|---|
| 2001/0027453 A1* | 10/2001 | Suto | .................... H04L 67/1095 |
| 2009/0138477 A1* | 5/2009 | Piira | ...................... H04L 67/34 |
| 2013/0010781 A1* | 1/2013 | Gresset | ................ H04J 3/0605 370/350 |
| 2014/0201343 A1* | 7/2014 | Keskkula | ................ H04L 67/22 709/221 |
| 2015/0286842 A1* | 10/2015 | Mori | .................... G06F 21/6245 726/30 |

* cited by examiner

*Primary Examiner* — James Trujillo
*Assistant Examiner* — Fariborz Khoshnoodi
(74) *Attorney, Agent, or Firm* — Alston & Bird LLP

(57) ABSTRACT

In accordance with various embodiments of the disclosed subject matter, a method and an apparatus for checking and updating data on a client terminal are provided. In some embodiments, the method comprises: obtaining a presentation time interval between two adjacent presenting actions of target data on the client terminal, and obtaining an update time interval between two adjacent updating actions of the target data on a server; calculating a weighted mean value of the target data based on the presentation time interval and the update time interval, as well as a preset presentation weight and a preset update weight; and determining an update check period of the client terminal for periodically performing an update operation to the target data based on the weighted mean value.

14 Claims, 3 Drawing Sheets

METHOD AND APPARATUS FOR CHECKING AND UPDATING DATA ON A CLIENT TERMINAL

CROSS-REFERENCES TO RELATED APPLICATIONS

This application claims the priority of Chinese Patent Application No. 201510743027.4 filed on Nov. 3, 2015, the entire content of which is incorporated herein by reference.

FIELD OF THE DISCLOSURE

The present disclosure generally relates to the field of Internet technology and, more particularly, relates to a method for checking and updating data on a client terminal, and an apparatus for checking and updating data on a client terminal.

BACKGROUND

The existing network servers usually provide new data that may generated periodically, such as serial novels, serial video, etc. A client terminal that subscribes the data needs to periodically check the data update progress of the server, downloads the new data based on the checking result, and automatically updates the data of the client terminal. As such, the data update progresses of the client terminal and the server can be synchronized, so that the latest data can be ensured to be available to the user of the client terminal.

Generally, when an update check period is reached, the client terminal can periodically send an update query request to the server to determine whether the server has new data with respect to the downloaded data in the client terminal. If there is new data in the server, the client terminal can download the new data. For example, a serial novel B in a client terminal A has been downloaded up to Chapter 10. When A arrives at a preset update check period, A can send an update query about B to check whether there is any new chapter of B after Chapter 10 in the server. If B is updated to Chapter 12 in the server, A can download data of Chapters 11 through 12 of B. As such, an automatic data update progress of serial novel B can be realized in client terminal A.

In the existing data update process, an update check period of a client terminal can be a system default value, or can be manually set by a user. Generally, when the update check period is reached, the client terminal performs a date update check for all target data having a same type. For example, a novel reading software can set a unified update check period for all subscribes serial novels. As another example, a video playback software can a unified update check period for all subscribes serial video.

However, an update check period of a server may not be a fixed period. That is, each time when new data is added to the server, the server can have different time interval. For example, different serial novels can have different updating speed. As another example, for a same serial novel, each update may take different time interval based on the author's input. Therefore, the update check period of a client terminal may be hard to match the update check period of the server.

If the update check period of the client terminal is longer than the update check period of the server, the user may not use the new data in time. On the contrary, in order to ensure that the user can use the new data in time, the update check period of the client terminal should be set as short as possible. In this case, update query requests are frequently sent from the client terminal to the server, which not only may increase the request responding pressure of the serve, but also may increase the consumption of the network traffic.

Especially, when a client terminal deals with a variety of data to be synchronized, such as multiple serial novels and/or serial video, the consumption of the network traffic can be huge, and the client terminal's data update workload can also be heavy. Therefore, it is desired to have a new method for checking and updating data on a client terminal, which can have lighter data update workload, and consume less network traffic.

The disclosed method and apparatus are directed to solve one or more problems set forth above and other problems.

BRIEF SUMMARY OF THE DISCLOSURE

In accordance with some embodiments of the disclosed subject matter, a method and an apparatus for checking and updating data on a client terminal are provided.

An aspect of the present disclosure provides a method for checking and updating data on a client terminal, comprising: obtaining a presentation time interval between two adjacent presenting actions of target data on the client terminal, and obtaining an update time interval between two adjacent updating actions of the target data on a server; calculating a weighted mean value of the target data based on the presentation time interval and the update time interval, as well as a preset presentation weight and a preset update weight; and determining an update check period of the client terminal for periodically performing an update operation to the target data based on the weighted mean value.

In some embodiments, calculating the weighted mean value comprises: using a preset level division rule to determine a representation level based on the presentation time interval, and to determine an update level based on the update time interval, wherein the preset level division rule describes a first mapping between the representation level and the presentation time interval, as well as a second mapping between the update level and the update time interval; and calculating the weighted mean value based on the presentation level, the update level, the preset presentation weight, and the preset update weight.

In some embodiments, the weighted mean value is calculated by using the following equation: $W=(S*Ws+P*Wp)/(Ws+Wp)$; wherein W is the weighted mean value of the target data, S is the representation level corresponding to the target data, P is the update level corresponding to the target data, Ws is the preset representation weight corresponding to the target data, and Wp is the preset update weight corresponding to the target data.

In some embodiments, obtaining the presentation time interval comprises: obtaining a representation history record from the client terminal indicating the recent presentations of the target data on the client terminal; and calculating a time difference between the most recent two presentations of the target data as the presentation time interval based on the representation history record.

In some embodiments, obtaining the update time interval comprises: obtaining an update history record from the server indicating the recent updates of the target data on the server; and calculating a time difference between the two most recent updates of the target data on the server as the update time interval based on the update history record.

In some embodiments, obtaining the presentation time interval comprises: obtaining a representation history record from the client terminal indicating the recent presentations of the target data on the client terminal; and calculating a mean value of time differences between adjacent presentations of the target data as the presentation time interval based on the representation history record.

In some embodiments, obtaining the update time interval comprises: obtaining an update history record from the server indicating the recent updates of the target data on the server; and calculating a mean value of time differences between adjacent updates of the target data on the server as the update time interval based on the update history record.

Another aspect of the present disclosure provides an apparatus for checking and updating data on a client terminal, comprising one or more processors, memory, and one or more program units stored in the memory and to be executed by the one or more processors, the one or more program units comprising: a time interval obtaining unit configured for obtaining a presentation time interval between two adjacent presenting actions of target data on the client terminal, and obtaining an update time interval between two adjacent updating actions of the target data on a server; a weighted mean value determining unit configured for calculating a weighted mean value of the target data based on the presentation time interval and the update time interval, as well as a preset presentation weight and a preset update weight; and an update check period determining unit configured for determining an update check period of the client terminal for periodically performing an update operation to the target data based on the weighted mean value.

Another aspect of the present disclosure provides a non-transitory computer readable memory comprising a computer readable program stored thereon, wherein, when being executed, the computer readable program causes a computer to implement a method for checking and updating data on a client terminal, the method comprising: obtaining a presentation time interval between two adjacent presenting actions of target data on the client terminal, and obtaining an update time interval between two adjacent updating actions of the target data on a server; calculating a weighted mean value of the target data based on the presentation time interval and the update time interval, as well as a preset presentation weight and a preset update weight; and determining an update check period of the client terminal for periodically performing an update operation to the target data based on the weighted mean value.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

In accordance with various embodiments, the disclosed subject matter provides a method and an apparatus for checking and updating data on a client terminal. The disclosed method can be used to control a client terminal to periodically download new data of target data provided by the server in different phases. As such, the target data update progresses of the client terminal and the server can be synchronized, so that the latest data can be ensured to be available to the users.

Figure 1:
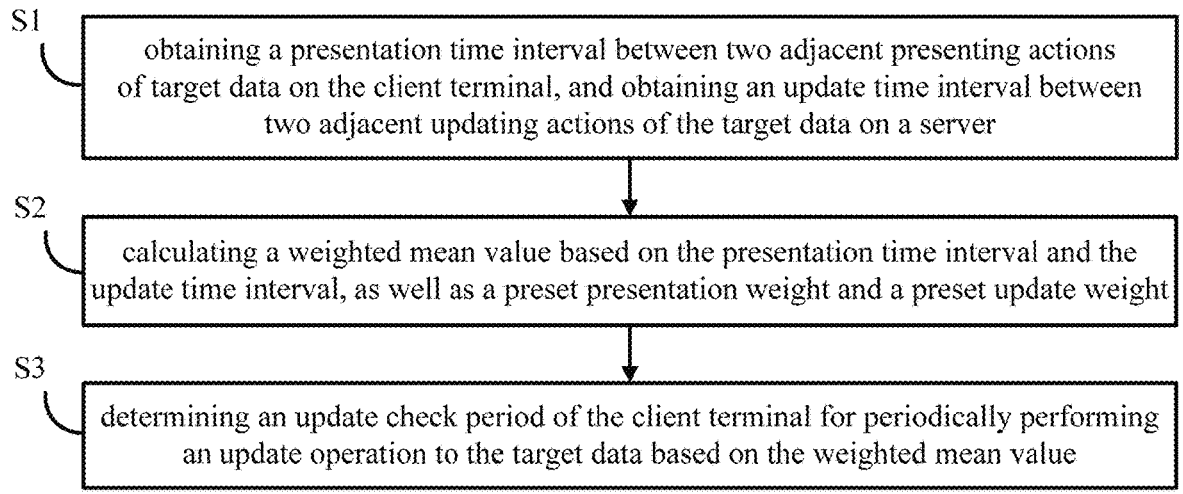
FIG. 1 illustrates a flowchart of an exemplary process for checking and updating data on a client terminal in accordance with some embodiments of the disclosed subject matter.

Referring to FIG. 1, a flowchart of an exemplary process for checking and updating data on a client terminal is shown in accordance with some embodiments of the disclosed subject matter. As illustrated, the process can include the following steps.

At step S1, a presentation time interval between two adjacent presenting actions of target data on the client terminal can be obtained, and an update time interval between two adjacent updating actions with respect to the target data on a server can be obtained.

At step S2, a weighted mean value between the presentation time interval and the update time interval can be calculated based on a preset presentation weight and a preset update weight.

At step S3, an update check period of the client terminal for periodically performing an update operation to the target data can be determined based on the weighted mean value.

The representation time interval can reflect a frequency of the target data being represented on the client terminal. That is, a frequency of the target data viewed by a user through the client terminal. The update time interval can reflect a frequency of the target data being updated on the server.

In some embodiments, a weighted mean value between the presentation time interval and the update time interval can be calculated based on a preset presentation weight and a preset update weight, and an update check period of the client terminal for the target data can be determined based on the weighted mean value. As such, the update check period of the client terminal for the target data can be positively related to the presentation time interval and the update time interval. That is, a larger representation time interval or a larger update time interval of the target data can correspond to a larger weighted mean value, and a longer update check period of the client terminal for the target data can be obtained.

In a practical scenario, a longer update time interval indicates a slower updating speed of the target data. In this case, if the update query requests are frequently sent to the server according to the existing method, most of the request results do not have new data, resulting in unnecessary network traffic consumption. However, the disclosed method can provide a relatively longer update check period in this case, which can greatly reduce the number of times to send the update query requests, not only reducing network traffic consumption, but also alleviating the server-side work pressure.

Similarly, a longer representation time interval indicates a lower frequency that the target data is viewed by the user. That is, a certain delay of the data update process of the client terminal may not affect the user's viewing experience. Therefore, the disclosed method can provide a relatively longer update check period in this case, which can greatly reduce the number of times to send the update query requests, not only reducing network traffic consumption, but also alleviating the server-side work pressure.

According to the above discussed technical scheme, in some embodiments of the disclosed method, a weighted mean value between the presentation time interval and the update time interval can be calculated based on a preset presentation weight and a preset update weight, and an update check period of the client terminal for the target data can be determined based on the weighted mean value. The presentation time interval and the update time interval can be obtained from corresponding historical records about the target data, so that the calculated update check period of the client terminal for the target data can be accorded with the current actual situation of the target data.

In some embodiments, the update check period of the client terminal for the target data can be automatically adjusted based on real-time updates of the presentation time interval and the update time interval, so that the calculated update check period of the client terminal for the target data can be accorded with the current actual situation of the target data.

Accordingly, the disclosed method can avoid unnecessary network traffic consumption, reduce client-side date update workload, and alleviate server-side work pressure.

Further, in some practical scenarios, there may be a plurality of target data to be updated in a same client terminal. For each target data, a corresponding update check period can be determined by the disclosed method discussed in the above embodiments. As such, different update check periods can be used for updating different target data respectively.

For example, the target data needed to be updated in a client terminal includes two series novels B1 and B2. Using the disclosed method, a first update check period of B1 can be determined as one day, and a second update check period of B2 can be determined as one week. Thus, the client terminal can send an update query request about B1 to the server every day, and can send an update query request about B2 to the server every week.

Thus, in the case when there is a plurality of target data to be updated in a same client terminal, some embodiments of the disclosed method can determine multiple update check periods matching each of the target data respectively. As such, a frequency of date update checking of the plurality of target data can be reduced, and a workload of the client terminal can be alleviated.

In some embodiments, the presentation time interval can be an average of multiple time differences between adjacent presentations of the target data. For example, a history record of a client terminal indicates that the most recent five recorded presentation time of the target data are $R_1$, $R_2$, $R_3$, $R_4$, $R_5$ respectively ($R_1>R_2>R_3>R_4>R_5$). The presentation time interval can be calculated as: $\Delta R=[(R_1-R_2)+(R_2-R_3)+(R_3-R_4)+(R_4-R_5)]/4$.

Similarly, based on history records of a server indicating the recent updating of the target data, the update time interval can be calculated as an average of multiple time differences between adjacent updates of the target data.

In some other embodiments, the presentation time interval obtained in step S1 can be determined in the following way. Based on a history record of a client terminal indicating the recent presentations of the target data, the presentation time interval can be calculated as a time difference between the most recent two presentations of the target data.

Still taking a serial novel as an example for the target data, the presentation time interval can a time difference between the most recent two viewings of the serial novel by a user through the client terminal. If a history record of the client terminal indicates that the last time the serial novel was viewed at time $R_1$, and the penultimate time the serial novel was viewed at time $R_2$, then the presentation time interval can be calculated as: $\Delta R=R_1-R_2$.

Correspondingly, based on history records of a server indicating the recent updating of the target data, the update time interval can be calculated as a time difference between the most recent two updates of the target data on the server.

Practically, due to the user's input, the time differences between adjacent times that the target data were viewed by the user can be vary significantly. That is, the adjacent presentation time intervals can be significantly different. Similarly, due to the updating operator's input, the time differences between adjacent times that the target data were updated on the server can be vary significantly. That is, the adjacent update time intervals can be significantly different.

Therefore, different from the embodiments of determining the presentation time interval and update time interval by calculating the mean values, the other embodiments can use the time difference between the most recent two presentations of the target data as the presentation time interval, and can use the time difference between the most recent two updates of the target data on the server as the update time interval. Without affecting the timely update of target data, the other embodiments can simplify the determination process of the presentation time interval and the update time interval, thereby improving the efficiency of the update check period determination process on the client-side.

Figure 2:
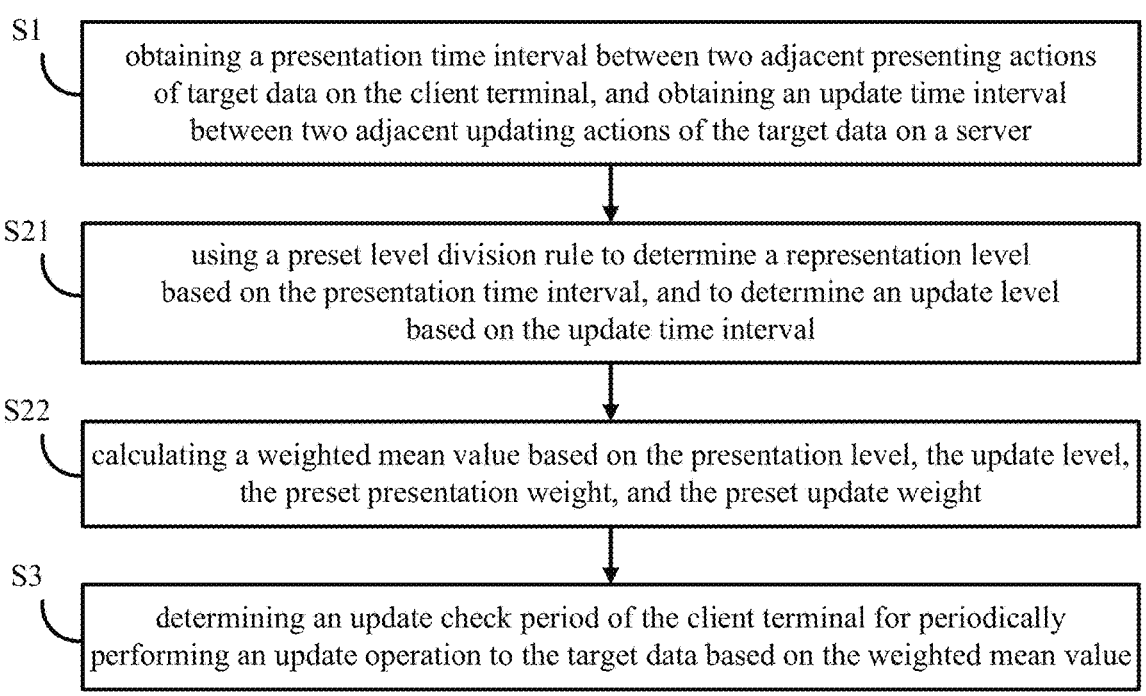
FIG. 2 illustrates a flowchart of another exemplary process for checking and updating data on a client terminal in accordance with some embodiments of the disclosed subject matter.

Referring to FIG. 2, a flowchart of another exemplary process for checking and updating data on a client terminal is shown in accordance with some embodiments of the disclosed subject matter. As illustrated, the step S2 for calculating a weighted mean value between the presentation time interval and the update time interval based on a preset presentation weight and a preset update weight can include the following steps.

At step S21, corresponding to a preset level division rule, a representation level can be determined based on the presentation time interval, and an update level can be determined based on the update time interval.

Taking the representation time interval as an example, an exemplary preset level division rule can be shown in Table 1 below.

TABLE 1

Representation time interval and representation level correspondence relationship

| | Representation time interval (ΔR) | | | |
|---|---|---|---|---|
| | ΔR ≤ 1 day | 1 day < ΔR ≤ 2 days | 2 days < ΔR ≤ 5 days | 5 days < ΔR |
| Representation level | $S_0$ | $S_1$ | $S_2$ | $S_3$ |

It should be noted that, the representation time interval and representation level correspondence relationship shown in Table 1 are only used as an example for description purposes, which should not limit the scope of the present disclosure.

When calculating the weighted mean value, different representation levels can correspond to different values. A longer representation time interval can correspond to a representation level with a larger value. Still using Table 1 as an example, the values of the four representation levels can be set as follows: $S_0=1$, $S_1=2$, $S_2=3$, $S_3=4$.

Similarly, an update time interval and update level correspondence relationship can be set referring to the exemplary division shown in Table 1.

It should be noted that, the level division rules of the representation levels and the update level can be the same or can be different. The division rules of the representation levels and the update level can be determined respectively according to actual situations.

The representation time interval and representation level correspondence relationship, and the update time interval and representation level correspondence relationship can be adjusted according to actual situations.

At step S22, the weighted mean value can be calculated based on the presentation level, the update level, the preset presentation weight, and the preset update weight.

Assuming that S is the representation level corresponding to the target data, P is the update level corresponding to the target data, Ws is the preset representation weight corresponding to the target data, and Wp is the preset update weight corresponding to the target data. In some embodiments of the present disclosure, the weighted mean value W of the target data can be calculated as W=(S*Ws+P*Wp)/(Ws+Wp).

Practically, the specific values of the presentation time interval and the update time interval can be varied, and distributed in a large range. For example, the specific values of the presentation time interval and the update time interval can be 1 hour, 1 day, 3 days, 1 week, etc. Thus, it is difficult to calculate the weighted mean value and to determine the update check period.

Therefore, without directly calculating the weighted mean value from the presentation time interval and the update time interval, in some embodiments, the presentation time interval and the update time interval can be respectively matched to corresponding presentation level and the update level in accordance with preset level division rules. Then the weighted average values of the representation level and the update level can be calculated, and the corresponding weighted mean value can be obtained based on the weighted average values of the representation level and the update level. As such, the weighted mean value can be kept within a known range which can facilitate to determine a correspondence relationship between the weighted mean value and the update check period.

In the following, a specific example is described to demonstrate the advantages of the disclosed method with respect to the existing data check and update method.

Suppose there are ten serial novels $B_i$ (i=1, 2, ..., 10) in a user's client terminal. And assume that each update check for each seral novel consumes 200 b of network traffic.

In an existing data check and update method, an update check period can be set to a half hour. That is, a total of 48 times of update checking operations are performed in one day. And for ten serial novels, the total daily network consumption for the update checking is 48*10*200 b=96000 b. It should be noted that, not every time of the network traffic consumption for the update checking can download new data, and not every time after the update checking the user view the ten serial novels. Thus, a large part of the 96 kb network traffic consumption is unnecessary consumption.

In some embodiments of the disclosed method, the representation time intervals can be matched to four representation levels $S_1$ (j=1, 2, 3, 4) with corresponding values $S_0=1$, $S_1=2$, $S_2=3$, $S_3=4$. That is, a small representation level value matches a short representation time interval. Similarly, the update time intervals can be matched to four representation levels $P_j$ (j=1, 2, 3, 4) with corresponding values $P_0=1$, $P_1=2$, $P_2=3$, $P_3=4$. That is, a small update level value matches a short update time interval.

Further, assume that a representation weight and an update weight can be set as Ws=Wp=1. Then a weighted mean value W(i) of the serial novel B, can be calculated by the following equation:

$$W(i)=(S(i)*Ws+P(i)*Wp)/(Ws+Wp)=(S(i)+P(i))/2$$

It should be noted that, $S(i) \in \{S_0, S_1, S_2, S_3\}$, and $P(i) \in \{P_0, P_1, P_2, P_3\}$. Therefore, a set of values of W(i) is {1, 1.5, 2, 2.5, 3, 3.5, 4}. A smaller the value of W(i) means a larger updating frequency of the serial novel $B_i$ on the service, and a larger representing frequency of the serial novel $B_i$ on the client terminal.

According to the seven possible values of the weighted mean value, seven corresponding update check period can be determined as shown in Table 2 below. It should be noted that, the correspondence relationship shown in Table 2 are only used as an example, which does not limit the scope of the present disclosure. The correspondence relationship between the weighted mean values and the update check periods can be determined and adjusted based on actual situations.

TABLE 2

Weighted mean value and the update check period correspondence relationship

| weighted mean value | 1 | 1.5 | 2 | 2.5 | 3 | 3.5 | 4 |
|---|---|---|---|---|---|---|---|
| update check period (hr) | 0.5 | 6 | 12 | 24 | 48 | 72 | 144 |

Suppose in the above ten serial novels, two serial novels correspond to a weighted mean value of 1, two serial novels correspond to a weighted mean value of 1.5, three serial novels correspond to a weighted mean value of 2.5, two serial novels correspond to a weighted mean value of 3, and one serial novel corresponds to a weighted mean value of 4.

According to the Table 2 shown above, the two serial novels with the weighted mean value of 1 can be checked for update 28 times per day, the two serial novels with the weighted mean value of 1.5 can be checked for update 4 times per day, the three serial novels with the weighted mean value of 2.5 can be checked for update every day, and the two serial novels with the weighted mean value of 3 can be checked for update every two days, and the one serial novel with the weighted mean value of 4 can be checked for update every six days.

Due to the differences of the update check periods of the ten serial novels, the daily network traffic consumption can be different. In one day that the network traffic consumption is minimum, seven serial novels with the weighted mean values of 1, 1.5 and 2.5 are needed to be updated, and the network traffic consumption is 2*48*200+2*4*200+3*1*200=21400 b. In one day that the network traffic consumption is maximum, all ten serial novels are needed to be updated, and the network traffic consumption is 21400+2*1*200+1*1*200=22000 b.

Compared with the above calculation result of the existing data check and update method, the disclosed method can provide less check times for updates per day, and lower daily network traffic consumption for checking updates. Therefore, the workloads of the client terminal and the server can be alleviated, and the network traffic consumption can be reduced.

Figure 3:
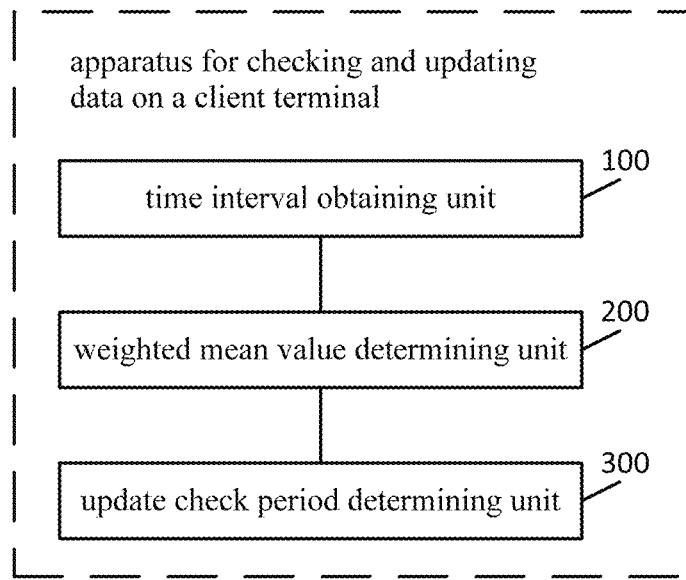
FIG. 3 illustrates a schematic structural diagram of an exemplary apparatus for checking and updating data on a client terminal in accordance with some embodiments of the disclosed subject matter.

Another aspect of the disclosed subject matter provides an apparatus for checking and updating data on a client terminal. Referring to FIG. 3, a schematic structural diagram of an exemplary apparatus for checking and updating data on a client terminal is shown in accordance with some embodiments of the disclosed subject matter.

As illustrated, the apparatus can include a time interval obtaining unit 100, a weighted mean value determining unit 200, and an update check period determining unit 300. Other units may also be included.

The time interval obtaining unit 100 can be used for obtaining a presentation time interval between two adjacent presenting actions of target data on a client terminal, and an update time interval between two adjacent updating actions with respect to the target data on a server.

The weighted mean value determining unit 200 can be used for calculating a weighted mean value between the presentation time interval and the update time interval based on a preset presentation weight and a preset update weight.

The update check period determining unit 300 can be used for determining an update check period of the client terminal for periodically performing an update operation to the target data based on the weighted mean value.

According to the above discussed technical scheme, in some embodiments of the disclosed apparatus, a weighted mean value between the presentation time interval and the update time interval can be calculated based on a preset presentation weight and a preset update weight, and an update check period of the client terminal for the target data can be determined based on the weighted mean value. The presentation time interval and the update time interval can be obtained from corresponding historical records about the target data, so that the calculated update check period of the client terminal for the target data can be accorded with the current actual situation of the target data.

In some embodiments, the update check period of the client terminal for the target data can be automatically adjusted based on real-time updates of the presentation time interval and the update time interval, so that the calculated update check period of the client terminal for the target data can be accorded with the current actual situation of the target data.

Accordingly, the disclosed apparatus can avoid unnecessary network traffic consumption, reduce client-side date update workload, and alleviate server-side work pressure.

Further, in some practical scenarios, there may be a plurality of target data to be updated in a same client terminal. For each target data, a corresponding update check period can be determined by the disclosed method discussed in the above embodiments. As such, different update check periods can be used for updating different target data respectively.

Figure 4:
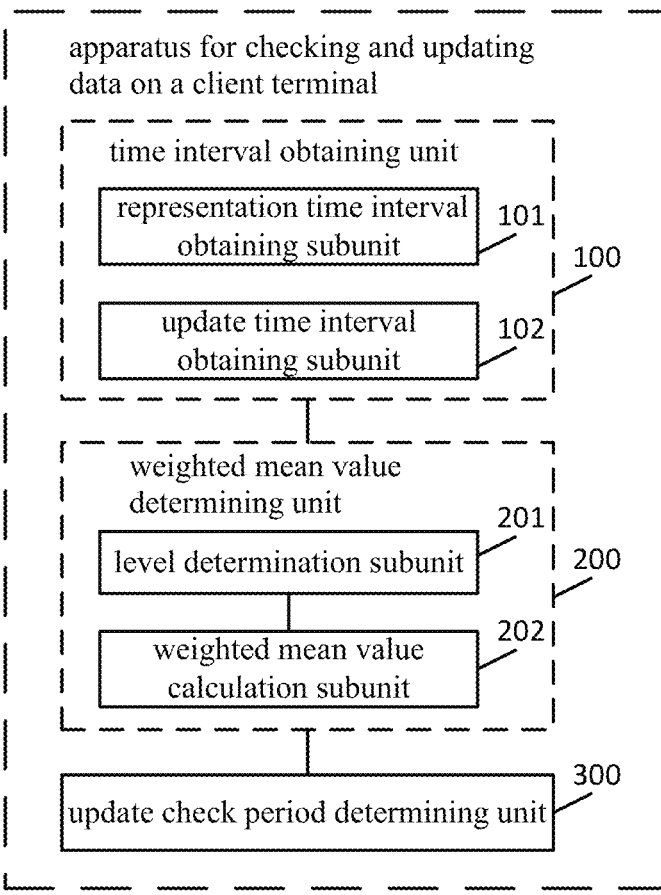
FIG. 4 illustrates a schematic structural diagram of another exemplary apparatus for checking and updating data on a client terminal in accordance with some embodiments of the disclosed subject matter.

Referring to FIG. 4, a schematic structural diagram of another exemplary apparatus for checking and updating data on a client terminal is shown in accordance with some embodiments of the disclosed subject matter. As illustrated, the weighted mean value determining unit 200 can specifically include a level determination subunit 201, and a weighted mean value calculation subunit 202.

The level determination subunit 201 can be used for determining a representation level based on the presentation time interval, and determining an update level based on the update time interval corresponding to a preset level division rule.

The weighted mean value calculation subunit 202 can be used for calculating the weighted mean value based on the presentation level, the update level, the preset presentation weight, and the preset update weight.

Specifically in some embodiments, the weighted mean value calculation subunit 202 can calculate the weighted mean value by using the following equation: $W=(S*Ws+P*Wp)/(Ws+Wp)$, where $W$ is the weighted mean value of the target data, $S$ is the representation level corresponding to the target data, $P$ is the update level corresponding to the target data, $Ws$ is the preset representation weight corresponding to the target data, and $Wp$ is the preset update weight corresponding to the target data.

Without directly calculating the weighted mean value from the presentation time interval and the update time interval, in some embodiments, the presentation time interval and the update time interval can be respectively matched to corresponding presentation level and the update level in accordance with preset level division rules. Then the weighted average values of the representation level and the update level can be calculated, and the corresponding weighted mean value can be obtained based on the weighted average values of the representation level and the update level. As such, the weighted mean value can be kept within a known range which can facilitate to determine a correspondence relationship between the weighted mean value and the update check period.

Still referring to FIG. 4, in some embodiments, the time interval obtaining unit 100 can specifically include a representation time interval obtaining subunit 101, and an update time interval obtaining subunit 102.

The representation time interval obtaining subunit 101 can be used for calculating a presentation time interval as a time difference between the most recent two presentations of the target data based on a history record of a client terminal indicating the recent presentations of the target data.

The update time interval obtaining subunit 102 can be used for calculating an update time interval as a time difference between the two most recent updates of the target data on a server based on history records of the server indicating the recent updating of the target data.

In some other embodiments, the time interval obtaining unit 100 can determine the presentation time interval and update time interval by calculating the mean values. However, by using the time difference between the two most recent presentations of a target data as the presentation time interval, and by using the time difference between the two most recent updates of the target data on the server as the update time interval, the time interval obtaining unit 100 can simplify the determination process of the presentation time interval and the update time interval without affecting the timely update of target data, thereby improving the efficiency of the update check period determination process on the client-side.

Figure 6:
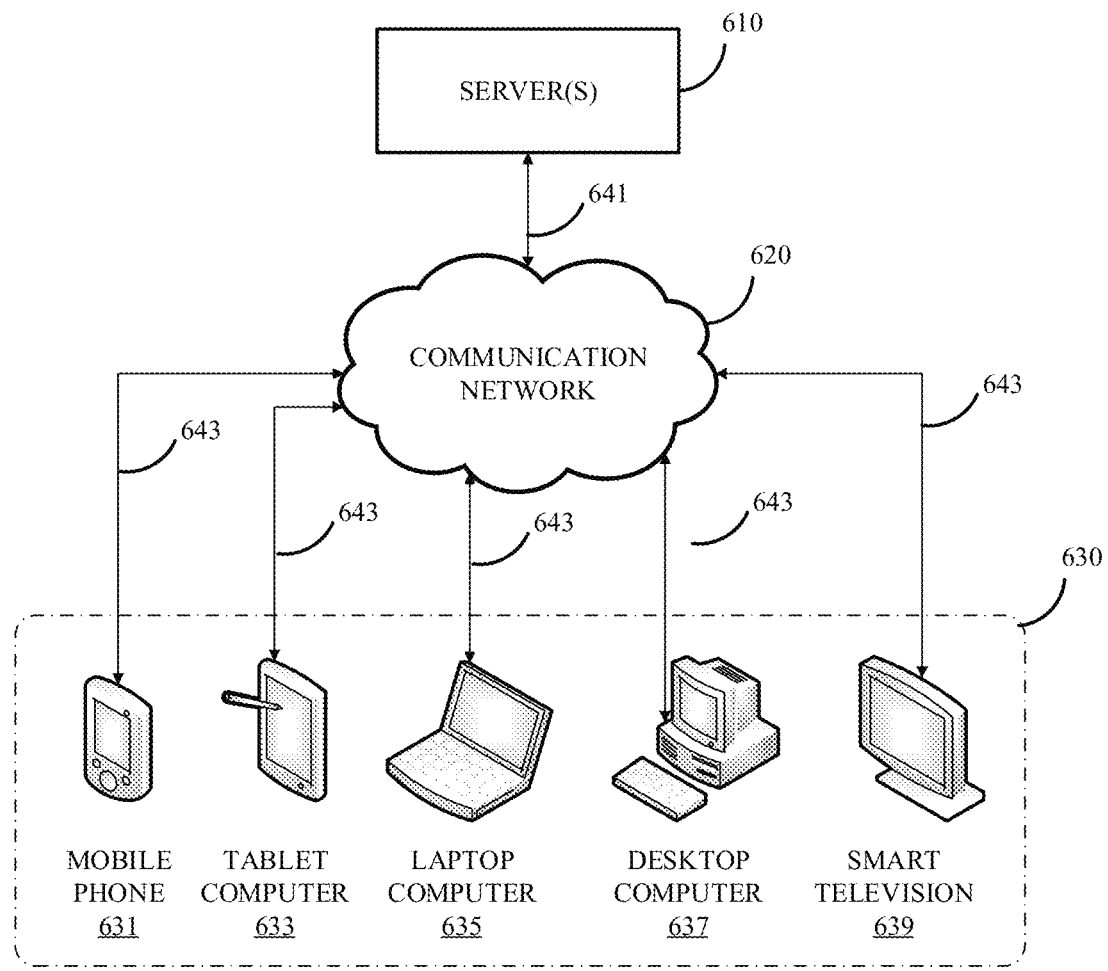
FIG. 6 illustrates a schematic structural diagram of an exemplary system incorporating certain aspects of the disclosed embodiments.

Referring to FIG. 6, an exemplary system for checking and updating data on a client terminal in accordance with some embodiments of the disclosed subject matter is shown. As illustrated, the system can include one or more servers 610, a communication network 620, one or more client terminals 630, and/or any other suitable component. Client terminals 630 can be connected by one or more communication links 643 to communications network 620 that can be linked via a communication link 641 to a server 610.

In some embodiments, one or more steps of, or all of, the method for checking and updating data on a client terminal described above in connection with FIGS. 1-2, can be implemented by one or more suitable hardware processors of server(s) 610, user device(s) 630, and/or other suitable component of the system.

Server(s) 610 and/or client terminal(s) 630 can include any suitable units described above in connection with FIGS. 3 and 4.

In some embodiments, communication network 620 can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

Client terminal(s) 630 can include any suitable device that can communicate with one or more severs though communication network 620, receive user request, process and transmit data, and/or present webpages, and/or perform any other suitable function. For example, a client terminal 630 can be a mobile phone 631, a tablet computer 633, a laptop computer 635, a desktop computer 637, a set-top box, a television 639, a streaming media player, a game console, and/or any other suitable device.

Although five type client terminals 631, 633, 635, 637, and 639 are shown in FIG. 6 to avoid over-complicating the drawing, any suitable number of these terminals, and any suitable types of these terminals, can be used in some embodiments.

Figure 5:
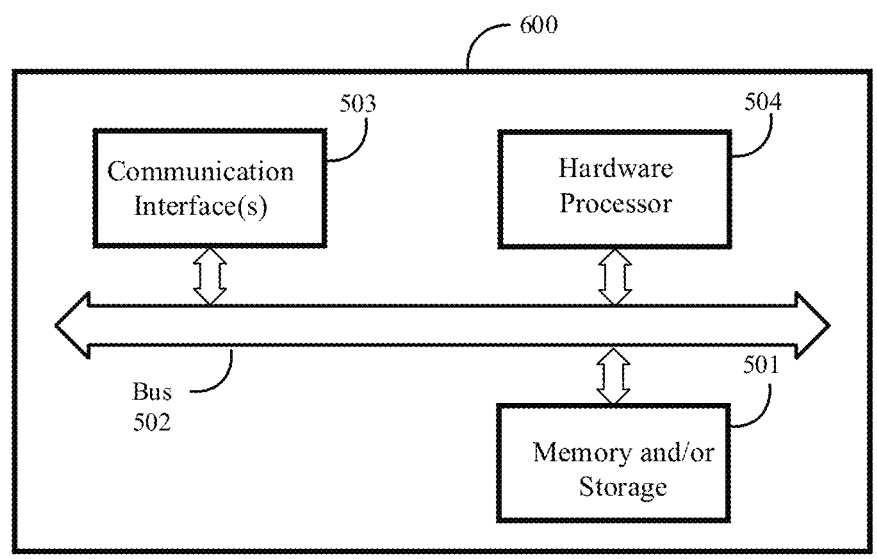
FIG. 5 illustrates a schematic hardware diagram of an exemplary apparatus for checking and updating data on a client terminal in accordance with some other embodiments of the disclosed subject matter.

The disclosed apparatus for checking and updating data on a client terminal can be one or more client terminal(s) 630, and can be implemented using any suitable hardware in some embodiments. For example, as illustrated in an exemplary hardware 600 of FIG. 5, such hardware can include a hardware processor 504, memory and/or storage 501, bus 502, and communication interface(s) 503.

Memory and/or storage 501 can be any suitable memory and/or storage for storing programs, data, media content, webpage URLs, raw data of webpage resources, information of users and/or any other suitable content in some embodiments. For example, memory and/or storage 501 can include random access memory (RAM), read only memory, flash memory, non-volatile memory, such as hard disk storage, optical media, and/or any other suitable storage device.

Communication interface(s) 503 can be any suitable circuitry for interfacing with one or more communication networks, such as communication network 620 in some embodiments. For example, interface(s) 514 can include network interface card circuitry, wireless communication circuitry, and/or any other suitable circuitry for interfacing with one or more communication networks, such as Internet, wide area network, local network, metropolitan area networks, etc.

Bus 502 can be any suitable mechanism for communicating between two or more of components of the webpage resource acquisition apparatus. Bus 502 may be an ISA bus, a PCI bus, an EISA bus, or any other suitable bus. The bus 502 can be divided into an address bus, a data bus, a control bus, etc. The bus 502 is represented as a two-way arrow in FIG. 5, but it does not mean that it is only one type bus or only one bus.

Memory and/or storage 501 can be used for storing program. The hardware processor 504 can operate the program in response to receiving an operating instruction. In some embodiments, one or more steps of, or all of, the method for checking and updating data on a client terminal described above in connection with FIGS. 1-2, can be implemented by hardware processors 504.

Hardware processor 504 can include any suitable hardware processor, such as a microprocessor, a micro-controller, a central processing unit (CPU), a network processor (NP), a digital signal processor (DSP), an application specific integrated circuit (ASIC), a field-programmable gate array (FPGA), or other programmable logic device, discrete gate or transistor logic device, discrete hardware components. The hardware processor 504 can implement or execute various embodiments of the disclosed subject matter including one or more method, steps and logic diagrams. A general purpose processor may be a microprocessor or any other conventional processors.

The steps of the disclosed method in various embodiments can be directly executed by a hardware decoding processor, or by a decoding processor combined by a hardware module and a software module. The software module may reside in any suitable storage/memory medium, such as a random access memory, a flash memory, a read-only memory, a programmable read-only memory, an electrically erasable programmable memory, a register, etc. The storage medium can be located in the memory and/or storage 501. Hardware processor 504 can implement the steps of the disclosed method by combining the hardware and the information read from the memory and/or storage 501.

In addition, the flowcharts and block diagrams in the figures illustrate various embodiments of the disclosed method and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

The disclosed subject matter provides a computer program product for performing a method for checking and updating data on a client terminal on a client terminal. The computer program product includes computer-readable storage medium storing program codes. The program code includes instructions for performing the disclosed method. The specific implementations of the disclosed method can be referred to the various embodiments described above in connection with FIGS. 1 and 2.

By using the disclosed methods and apparatus, a weighted mean value between the presentation time interval and the update time interval can be calculated based on a preset presentation weight and a preset update weight, and an update check period of the client terminal for the target data can be determined based on the weighted mean value. The presentation time interval and the update time interval can be obtained from corresponding historical records about the target data, so that the calculated update check period of the client terminal for the target data can be accorded with the current actual situation of the target data.

In some embodiments, the update check period of the client terminal for the target data can be automatically adjusted based on real-time updates of the presentation time interval and the update time interval, so that the calculated update check period of the client terminal for the target data can be accorded with the current actual situation of the target data.

Accordingly, the disclosed method and apparatus can avoid unnecessary network traffic consumption, reduce client-side date update workload, and alleviate server-side work pressure.

Those skilled in the art can clearly understand that, for convenience and simplicity of description, the specific working process of the systems, devices and units described above can be referred to the corresponding processes of various embodiments of the disclosed method described above.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure. It should be noted that, similar reference numerals and letters are refer to similar items in the figures, and thus once an item is defined in one figure, it can be no further defined and explained in the subsequent figures.

What is claimed is:

1. A method for checking and updating data on a client terminal, comprising:

obtaining a presentation time interval between two adjacent presenting actions of target data on the client terminal, and obtaining an update time interval between two adjacent updating actions of the target data on a server;

calculating a weighted mean value of the target data based on the presentation time interval and the update time interval, as well as a preset presentation weight and a preset update weight, wherein calculating the weighted mean value comprises:

using a preset level division rule to determine a representation level based on the presentation time interval, and to determine an update level based on the update time interval, wherein the preset level division rule describes a first mapping between the representation level and the presentation time interval, and a second mapping between the update level and the update time interval; and calculating the weighted mean value using a following equation:

$$W=(S*Ws+P*Wp)/(Ws+Wp),$$

wherein W is the weighted mean value of the target data, S is the representatuion level corresponding to the target data, P is the update level corresponding to the target data, Ws is the preset representation weight corresponding to the target date, and Wp is the preset update weight corresponding to the target data; and determining an update check period of the client terminal for periodically performing an update operation to the target data based on the weighted mean value.

2. The method of claim 1, wherein obtaining the presentation time interval comprises:

obtaining a representation history record from the client terminal indicating the recent presentations of the target data on the client terminal; and calculating a time difference between the most recent two presentations of the target data as the presentation time interval based on the representation history record.

3. The method of claim 2, wherein obtaining the update time interval comprises:

obtaining an update history record from the server indicating the recent updates of the target data on the server; and calculating a time difference between the two most recent updates of the target data on the server as the update time interval based on the update history record.

4. The method of claim 1, wherein obtaining the presentation time interval comprises:

obtaining a representation history record from the client terminal indicating the recent presentations of the target data on the client terminal; and calculating a mean value of time differences between adjacent presentations of the target data as the presentation time interval based on the representation history record.

5. The method of claim 4, wherein obtaining the update time interval comprises:

obtaining an update history record from the server indicating the recent updates of the target data on the server; and calculating a mean value of time differences between adjacent updates of the target data on the server as the update time interval based on the update history record.

6. An apparatus for checking and updating data on a client terminal, comprising:

one or more processors, and memory for storing one or more progran units executed by the one or more processors, wherein the one or more processors are configured to:

obtain a presentation time interval between two adjacent presenting actions of target data on the client terminal, and obtaining an update time interval between two adjacent updating actions of the target data on a server;

calculate a weighted mean value of the target data based on the presentation time interval and the update time interval, as well as a preset presentation weight and a preset update weight by:

using a preset level division rule to determine a representation level based on the presentation time interval, and to determine an update level based on the update time interval, wherein the preset level division rule describes a first mapping between the representation level and the presentation time interval, and a second mapping between the update level and the update time interval; and calculating the weighted mean value using a following equation:

$$W=(S*Ws+P*Wp)/(Ws+Wp),$$

wherein W is the weighted mean value of the target data, S is the representation level corresponding to the target data, P is the update level corresponding to the target data, Ws is the preset representation weight corresponding to the target data, and Wp is the preset update weight corresponding to the target data; and determine an update check period of the client terminal for periodically performing an update operation to the target data based on the weighted mean value.

7. The apparatus of claim 6, wherein the one or more processors are further configured to:

otain a representation history record from the client terminal indicating the recent presentations of the target data on the client terminal; and obtain a representation history record from the client terminal indicating the recent presentations of the target data on the client terminal; and calculate a time difference between the most recent two presentations of the target data as the presentation time interval based on the representation history record.

8. The apparatus of claim 7, wherein the one or more processors are further comfigured to:

obtain an update history record from the server indicating the recent updates of the target data on the server; and calculate a time difference between the two most recent updates of the target data on the server as the update time interval based on the update history record.

9. The apparatus of claim 6, wherein the one or more processors are further configured to:

obtain a representation history record from the client terminal indicating the recent presentations of the target data on the client terminal; and calculate a mean value of time differences between adjacent presentations of the target data as the presentation time interval based on the representation history record.

10. The apparatus of claim 9, wherein the one or more processors are further configured to:

obtain an update history record from the server indicating the recent updates of the target data on the server; and calculate a mean value of time differences between adjacent updates of the target data on the server as the update time interval based on the update history record.

11. A non-transitory computer readable memory comprising a computer readable program stored thereon, wherein, when being executed, the computer readable program causes a computer to implement a method for checking and updating data on a client terminal, the method comprising:

obtaining a presentation time interval between two adjacent presenting actions of target data on the client terminal, and obtaining an update time interval between two adjacent updating actions of the target data on a server;

calculating a weighted mean value of the target data based on the presentation time interval and the update time interval, as well as a preset presentation weight and a preset update weight, wherein calculating the weighted mean value comprises:

using a preset level division rule to determine a representation level based on the presentation time interval, and to determine an update level based on the update time interval, wherein the preset level division rule describes a first mapping between the representation level and the presentation time interval, and a second mapping between the update level and the update time interval; and calculating the weighted mean value using a following equation:

$$W=(S*Ws+P*Wp)/(Ws+Wp),$$

wherein W is the weighted mean value of the target data, S is the representation level corresponding to the target data, P is the update level corresponding to the target data, Ws is the preset representation weight corresponding to the target data, and Wp is the preset update weight corresponding to the target data; and determining an update check period of the client terminal for periodically performing an update operation to the target data based on the weighted mean value.

12. The non-transitory computer readable memory of claim 11, wherein obtaining the presentation time interval comprises:

obtaining a representation history record from the client terminal indicating the recent presentations of the target data on the client terminal; and calculating a time difference between the most recent two presentations of the target data as the presentation time interval based on the representation history record.

13. The non-transitory computer readable memory of claim 12, wherein obtaining the update time interval comprises:

obtaining an update history record from the server indicating the recent updates of the target data on the server; and calculating a time difference between the two most recent updates of the target data on the server as the update time interval based on the update history record.

14. The non-transitory computer readable memory of claim 11, wherein:

obtaining the presentation time interval comprises:

obtaining a representation history record from the client terminal indicating the recent presentations of the target data on the client terminal, and calculating a mean value of time differences between adjacent presentations of the target data as the presentation time interval based on the representation history record; and obtaining the update time interval comprises:

obtaining an update history record from the server indicating the recent updates of the target data on the server, and calculating a mean value of time differences between adjacent updates of the target data on the server as the update time interval based on the update history record.

\* \* \* \* \*

UNITED STATES PATENT AND TRADEMARK OFFICE
CERTIFICATE OF CORRECTION

PATENT NO.         : 10,650,025 B2
APPLICATION NO.    : 15/340720
DATED              : May 12, 2020
INVENTOR(S)        : Guo et al.

It is certified that error appears in the above-identified patent and that said Letters Patent is hereby corrected as shown below:

In the Claims

Column 15,
Lines 37-39, cancel "otain a representation history record from the client terminal indicating the recent presentations of the target data on the client terminal; and".

Signed and Sealed this
Third Day of November, 2020

Andrei Iancu
*Director of the United States Patent and Trademark Office*